(12) United States Patent
Artan et al.

(10) Patent No.: US 9,177,214 B1
(45) Date of Patent: Nov. 3, 2015

(54) METHOD AND APPARATUS FOR AN ADAPTIVE THRESHOLD BASED OBJECT DETECTION

(71) Applicant: Xerox Corporation, Norwalk, CT (US)

(72) Inventors: Yusuf O. Artan, Rochester, NY (US); Peter Paul, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 47 days.

(21) Appl. No.: 14/249,981

(22) Filed: Apr. 10, 2014

(51) Int. Cl.
| | |
|---|---|
| G06K 9/00 | (2006.01) |
| G06K 9/52 | (2006.01) |
| G06K 9/62 | (2006.01) |
| G06K 9/46 | (2006.01) |
| H04N 5/33 | (2006.01) |
| H04N 7/18 | (2006.01) |

(52) U.S. Cl.
CPC .............. *G06K 9/00838* (2013.01); *G06K 9/46* (2013.01); *G06K 9/4604* (2013.01); *G06K 9/52* (2013.01); *G06K 9/6256* (2013.01); *H04N 5/33* (2013.01); *G06K 2009/4666* (2013.01)

(58) Field of Classification Search
USPC ........... 382/10, 103–107, 155, 162, 165, 168, 382/173, 181, 199, 203, 209, 232, 254, 274, 382/276, 286–291, 305, 312; 348/148, 149; 705/417; 296/76
See application file for complete search history.

(56) References Cited

U.S. PATENT DOCUMENTS

| | | | |
|---|---|---|---|
| 2003/0102688 A1* | 6/2003 | Bingle et al. ............... | 296/76 |
| 2007/0027825 A1* | 2/2007 | Pearce et al. ............... | 705/417 |
| 2013/0051625 A1* | 2/2013 | Fan et al. ................... | 382/104 |
| 2013/0141574 A1* | 6/2013 | Dalal et al. ................. | 348/148 |
| 2013/0147959 A1* | 6/2013 | Wang et al. ................ | 348/149 |

OTHER PUBLICATIONS

Zhu et al. "Face Detection, Pose Estimation, and Landmark Localization in the Wild", Dept of Computer Science, University of California, Irvine. Consists of 8 pages.
Massart, et al. "Visual Presentation of Data by Means of Box Plots" Vrije University Brussel, Belgium, LC.GC Europe 18 (4) 215-218 (2005) pp. 2-5.

* cited by examiner

*Primary Examiner* — Seyed Azarian

(57) ABSTRACT

A method, non-transitory computer readable medium, and apparatus for detecting an object in an image are disclosed. For example, the method receives the image, calculates a score for each one of a plurality of locations in the image, performs a box plot of the score of the each one of the plurality of locations of the image, identifies an outlier score that falls outside of the box plot, determines that a distance ratio of the outlier score is less than a predefined distance ratio and detects the object in a location of the plurality of locations of the image corresponding to the outlier score.

18 Claims, 5 Drawing Sheets

METHOD AND APPARATUS FOR AN ADAPTIVE THRESHOLD BASED OBJECT DETECTION

The present disclosure relates generally to automatic detection of objects, and, more particularly, to a method and an apparatus for an adaptive threshold based object detection.

BACKGROUND

Cities are attempting to reduce the number of cars on the road and improve commuting times by creating high occupancy vehicle (HOV) lanes or high occupancy tolling (HOT) lanes. For example, certain highways may have lanes dedicated for cars carrying two or more persons or three or more persons. However, some cars having only a single person may attempt to drive in these lanes creating extra congestion, which defeats the purpose of the HOV/HOT lanes.

Currently, to enforce traffic rules associated with the HOV/HOT lanes law enforcement officers must be dispatched to a side of the HOV or HOT lanes to visually examine incoming or passing vehicles. Using law enforcement officers for counting people in cars of an HOV/HOT lane may be a poor utilization of the law enforcement officers. In other words, deploying law enforcement officers to regulate the HOV/HOT lanes is expensive and inefficient.

Some facial detection methods have attempted to automate detection of people in vehicles for the HOV or HOT lanes. However, due to varying conditions or varying image quality, the currently deployed methods may not be consistent or accurate in detecting people in a vehicle.

SUMMARY

According to aspects illustrated herein, there are provided a method, a non-transitory computer readable medium, and an apparatus for detecting an object in an image. One disclosed feature of the embodiments is a method that receives the image, calculates a score for each one of a plurality of locations in the image, performs a box plot of the score of the each one of the plurality of locations of the image, identifies an outlier score that falls outside of the box plot, determines that a distance ratio of the outlier score is less than a predefined distance ratio and detects the object in a location of the plurality of locations of the image corresponding to the outlier score.

Another disclosed feature of the embodiments is a non-transitory computer-readable medium having stored thereon a plurality of instructions, the plurality of instructions including instructions which, when executed by a processor, cause the processor to perform an operation that receives the image, calculates a score for each one of a plurality of locations in the image, performs a box plot of the score of the each one of the plurality of locations of the image, identifies an outlier score that falls outside of the box plot, determines that a distance ratio of the outlier score is less than a predefined distance ratio and detects the object in a location of the plurality of locations of the image corresponding to the outlier score.

Another disclosed feature of the embodiments is an apparatus comprising a processor and a computer readable medium storing a plurality of instructions which, when executed by the processor, cause the processor to perform an operation that receives the image, calculates a score for each one of a plurality of locations in the image, performs a box plot of the score of the each one of the plurality of locations of the image, identifies an outlier score that falls outside of the box plot, determines that a distance ratio of the outlier score is less than a predefined distance ratio and detects the object in a location of the plurality of locations of the image corresponding to the outlier score.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for detecting an object in an image. As discussed above, to enforce traffic rules associated with the HOV/HOT lanes law enforcement officers must be dispatched to a side of the HOV or HOT lanes to visually examine incoming or passing vehicles. Using law enforcement officers for counting people in cars of an HOV/HOT lane may be a poor utilization of the law enforcement officers. In other words, deploying law enforcement officers to regulate the HOV/HOT lanes is expensive and inefficient.

One embodiment of the present disclosure provides a method for automatically detecting objects in an image. This information may then be used to automatically determine a number of people in a vehicle to assess whether the vehicle is in violation of the HOV/HOT lane rules or regulations. As a result, law enforcement officers may be more efficiently deployed.

Previous automated methods relied on a static threshold value for determining whether an object is detected in the image. However, due to varying conditions, image quality and low contrast of images, previous automated methods would have a low accuracy.

One embodiment of the present disclosure improves the accuracy of automated object detection in images using a distance ratio that is not a fixed scalar threshold value. In one embodiment, training images may be analyzed to calculate a predefined distance ratio. Then, a distance ratio of the outlier scores in subsequently analyzed images may be compared to a predefined distance ratio to determine if the outlier score is an object. Thus, an outlier score may have a wide range of values from image to image, but may still be considered to be an object based upon a distance relative to a distance of a second highest score in the image, as will be discussed in further detail below.

Figure 1:
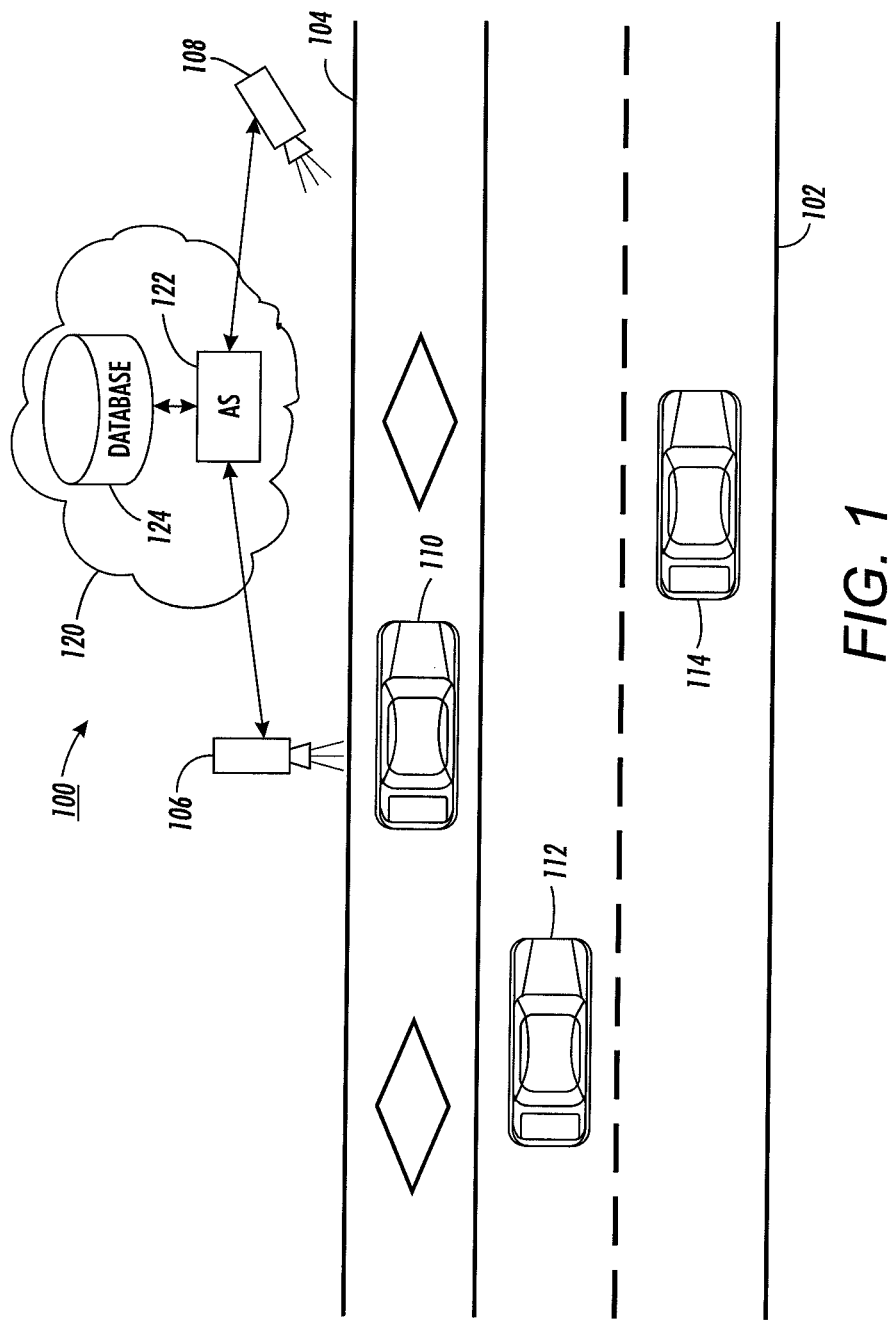
FIG. 1 illustrates an example system of the present disclosure.

FIG. 1 illustrates an example system 100 of the present disclosure. In one embodiment, the system 100 may include an Internet protocol (IP) network 120. The IP network 120 may include an application server (AS) 122 and a database (DB) 124. The IP network 120 may include other network elements, such as for example, border elements, firewalls, routers, switches, and the like that are not shown for simplicity. In one embodiment, the IP network 120 may be operated by a law enforcement agency or an agency in charge of monitoring and/or enforcing HOV/HOT rules and regulations.

In one embodiment, the AS 122 may perform various functions disclosed herein and be deployed as a server or a general purpose computer described below in FIG. 5. In one embodiment, the DB 124 may store various types of information. For example, the DB 124 may store the algorithms used by the AS 122, the equations discussed below, the images captured, the results of the analysis performed by the AS 122, and the like.

In one embodiment, the AS 122 may be in communication with one or more image capture devices 106 and 108. In one embodiment, the communication may be over a wired or wireless communication path. Although only two image capture devices 106 and 108 are illustrated in FIG. 1, it should be noted that any number of image capture devices 106 and 108 may be deployed.

In one embodiment, the image capture devices 106 and 108 may be a near infrared (NIR) band image capture device, a camera, a video camera, and the like. In one embodiment, the image capture device 108 may be positioned to capture an image of a front side of a vehicle 110. In one embodiment, the image capture device 106 may be positioned to capture a side view of the vehicle 110 or a B-Frame image. In one embodiment, the image capture devices 106 and 108 may be coupled to a motion sensor or other triggering device to automatically capture an image or images whenever the vehicle 110 triggers the motion sensor or the triggering device. In another embodiment, the image capture devices 106 and 108 may automatically capture an image or images of the vehicle at an entrance of a HOV/HOT lane 104.

As discussed above, a highway 102 may include the HOV/HOT lane 104 to help reduce the number of vehicles 110, 112 and 114 on a roadway, reduce congestion and reduce pollution by encouraging car pooling. The system 100 may be deployed to automatically monitor and regulate the vehicles 110, 112 and 114 in the HOV/HOT lane 104 to ensure that the vehicles 110, 112 and 114 have a sufficient number of passengers to qualify for use of the HOV/HOT lane 104.

Figure 2:
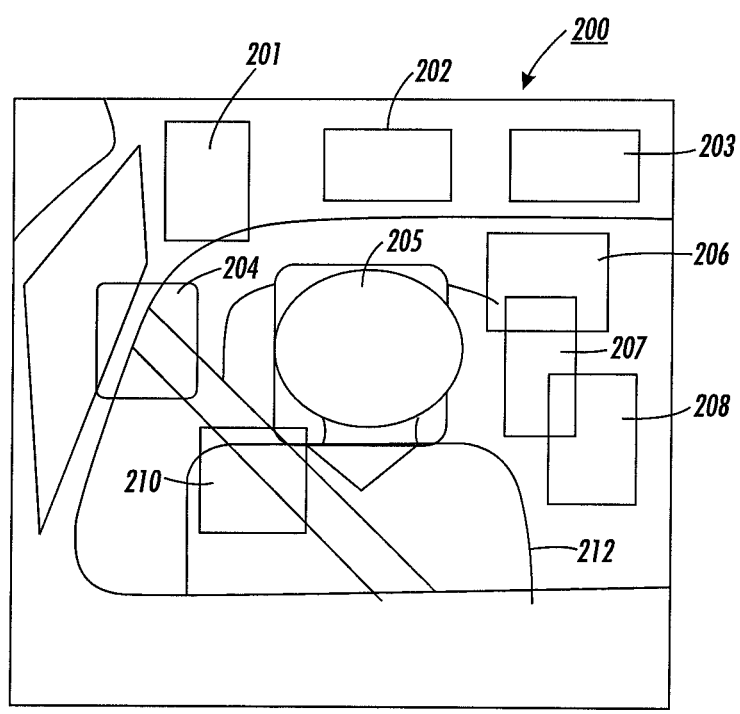
FIG. 2 illustrates an example image of the present disclosure.

FIG. 2 illustrates an example image 200 captured by the image capture device 108 of a front of the vehicle 110. In one embodiment, the image 200 may be analyzed by the AS 122 to determine if an object 212 is detected. In one embodiment, the object 212 may be a person in the vehicle 110.

In one embodiment, a plurality of locations 201-210 in the image 200 may be analyzed to calculate a score. In one embodiment, the plurality of locations 201-210 may be randomly selected. In one embodiment, the locations 201-210 may be selected such that every portion of the image 200 is analyzed. In another embodiment, the locations 201-210 may be determined based upon one or more landmark points associated with a mixture of the image. The one or more landmark points and the mixture of the image are discussed in further detail below.

In one embodiment, the score for each one of the locations 201-210 may be calculated using Equation (1) below:

$$S(I, L, m) = \text{App}_m(I, L) + \text{Shape}_m(L) + \alpha^m, \quad \text{Eq. (1)}$$

$$\text{App}_m(I, L) = \sum_{i \in V_m} w_i^m \cdot \phi(I, l_i)$$

-continued $$\text{Shape}_m(L) = \sum_{ij \in E_m} a_{ij}^m dx^2 + b_{ij}^m dx + c_{ij}^m dy^2 + d_{ij}^m dy$$

wherein S is a score as a function of the image being analyzed I, the one or more landmark points L tuned for a mixture m, $\phi(I, l_i)$ is the HoG (Histogram of Gradients) features extracted at location $l_i$, $\text{App}_m$ is a sum of appearance evidence for placing a template $w_i^m$ for a part tuned for the mixture m at a location $l_i$ of the image. $\text{Shape}_m$ is a score of a mixture specific spatial arrangement of parts L (dx and dy are the x-axis and y-axis displacements of part i with respect to part j, and parameters (a, b, c and d) specify the spatial cost constraints between pairs of parts i and j) or a geometric relationship between the one or more landmark points (e.g., a number of pixels between a corner of an eye to an eyelid) and $\alpha^m$ is a constant for the mixture m. $V_m$ represents a pool of parts belonging to the mixture m. $E_m$ represents a set of edges between the pool of parts in $V_m$.

The Equation 1 is an approach to encode the elastic deformation and 3D structure of an object for face detection and pose estimation. The Equation 1 uses a mixture of poses with a shared pool of parts defined at each landmark position. The Equation 1 then uses global mixtures to model topological changes due to different viewpoints. The global mixture can also be used to capture gross deformation changes for a single viewpoint. In one embodiment, each particular configuration of parts or landmark points L may be defined by Equation (2) below:

$$L = \{l_i = (x_i, y_i): i \square V\}, \quad \text{Eq. (2):}$$

wherein $l_i$ is the ith part location and V is a shared pool of parts. In one embodiment, the one or more landmark points may be points in the image that identifies a specific portion of the object. For example for a human face, a landmark point may be a corner of an eye, a curve of an ear, a circular point of a nostril or of a lip, and the like. In one embodiment, a human face may have between 38 to 68 landmark points. Each one of the landmark points may have the collection of parts V located at various coordinates $(x_i, y_i)$ of the ith part of the image.

In one embodiment, the one or more landmarks may vary depending on the mixture of parts that are analyzed. For example, depending on an angle of the face (e.g., a 90 degree face, a 70 degree face, a 50 degree face, and so forth) only a single ear may be seen or a single eye, and so forth. In one embodiment, thirteen different mixtures may be used for the human face. Each one of the thirteen different mixtures may have its own set of one or more landmark points. In one embodiment, the one or more landmark points may be obtained for each one of the mixtures based upon a plurality of training images that are analyzed. In one embodiment, the plurality of training images (e.g., a few hundred images) may be used as part of a supervised learning classifier that includes training images that are marked images (e.g., marked with the known object, the land mark points for a given mixture, and the like). In one embodiment, further details for Equations 1 and 2 may be found in a study by Zhu and Ramanan entitled "Face Detection, Pose Estimation, and Landmark Localization in the Wild", 2012, which is incorporated by reference in its entirety.

Previous methods that used the scoring Equation (1) above, for example in Zhu and Ramanan, used a static scalar threshold value to determine if an object was detected. However, as discussed above, due to varying environmental conditions, image quality or low contrast in images, using a static scalar threshold leads to a low accuracy problem.

In one embodiment, the present disclosure may use a distance ratio as a threshold to determine if an object 212 is detected in the image 200. In one embodiment, by using the distance ratio rather than a static scalar threshold value, the value of the threshold may be dynamic or different for each image 200 that is analyzed. In other words, a plurality of different images may each have one or more objects having a score value that fluctuates or varies over a wide range from image to image. However, the distance ratio for the object for each image may be within a small range that is less than a predefined distance ratio. In one embodiment, the scores of a plurality of different locations on the training images may be used to perform a box plot of the scores for each image and calculate the predefined distance ratio threshold.

Figure 3:
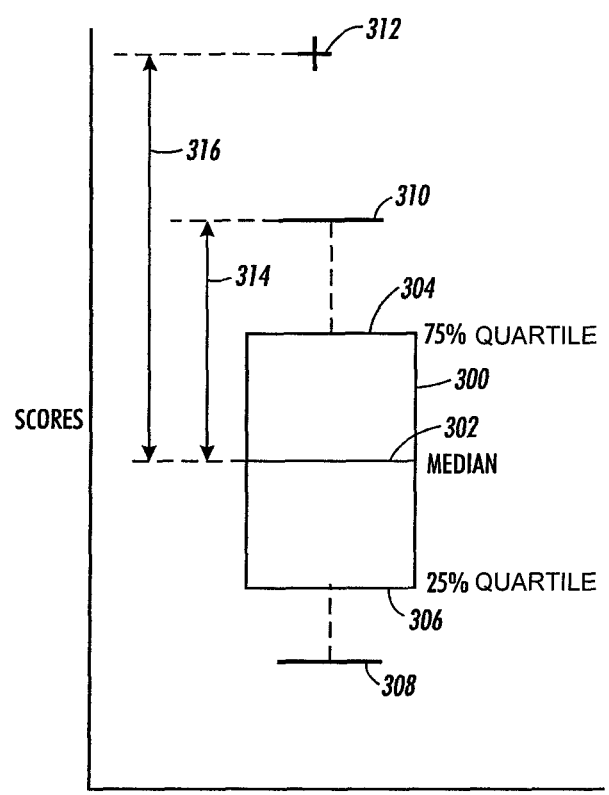
FIG. 3 illustrates an example box plot of the present disclosure.

FIG. 3 illustrates one embodiment of a box plot 300 that is performed for the training images and the images that are analyzed to detect an object. In one embodiment, the box plot 300 may be a plot of all of the scores of an image. The box plot 300 may include a median 302, a 25% quartile score 306, a 75% quartile score 304, a lowest score 308 and a second highest score 310. The box plot 300 may also include an outlier score 312. In one embodiment, the outlier score 312 may be identified as the outlier score if the score is outside of the box plot. In other words, the outlier score 312 does not fall within the range from the second highest score 310 to the lowest score 308.

Using the previous methods that have static threshold, the outlier score 312 may not be identified as an object if the outlier score 312 is too close to the second highest score 310. In one embodiment, multiple outlier scores 312 may be identified. However, to account for varying image qualities, environmental conditions and varying contrast in images, a predefined distance ratio threshold may be calculated and used that in essence provides a dynamic threshold value instead of a static threshold value.

In one embodiment, the distance ratio may be calculated based upon a distance 314 of the second highest score 310 to a distance 316 of the outlier score 312. In one embodiment, the distance 314 may be measured from the median 302 of the box plot 300 to the second highest score 310. In one embodiment, the distance 316 may be measured from the median 302 of the box plot 300 to the outlier score 312.

In one embodiment, the distance ratio for each one of a plurality of training images may be calculated. Based upon the calculated distance ratio, a predefined distance ratio threshold may be used for subsequently analyzed images to identify an object in an image. In one embodiment, the predefined distance ratio threshold may be approximately 0.6 for NIR images of 750 nanometers (nm) to 1000 nm. If multiple outlier scores 312 are identified and each outlier score 312 is below the distance ratio threshold, then multiple objects may be detected in the image.

Thus, in one example, if the image 200 is captured and analyzed, the outlier score 312 may correspond to the score of the location 205 and have a value of −0.20227. The second highest score 310 may correspond to the score of the location 210 and have a value of −1.003 and the median score is −1.412. The predefined distance ratio threshold may have been calculated to be 0.6. Thus, the distance of the second highest score 310 of the image 200 in the above example would be −0.409 (e.g., median−second highest score=−1.412−−1.003=−0.409) and the distance of the outlier score 312 of the image 200 would be −1.20973 (e.g., median−outlier score=−1.412−−0.20227=−1.20973). The distance ratio would be 0.338 (e.g., distance of second highest score/distance of outlier score=−0.409/−1.20973=0.338). Thus, the outlier score 312 would be detected as being an object since the distance ratio is less than the predefined ratio 0.6 (e.g., 0.338<0.6).

When the objects being detected are people, the object detection may be used to automatically regulate or manage the HOV/HOT lane 104. For example, the total number of people in the vehicle 110 may be calculated by summing the total number of objects detected in the vehicle 110 from the images that are analyzed. If the total number of people is less than a total number of passengers requirement for the HOV/HOT lane 104, a ticket may be automatically generated and mailed to the registered owner of the vehicle 110. The registered owner of the vehicle may be identified based on a license plate number captured in the image.

Figure 4:
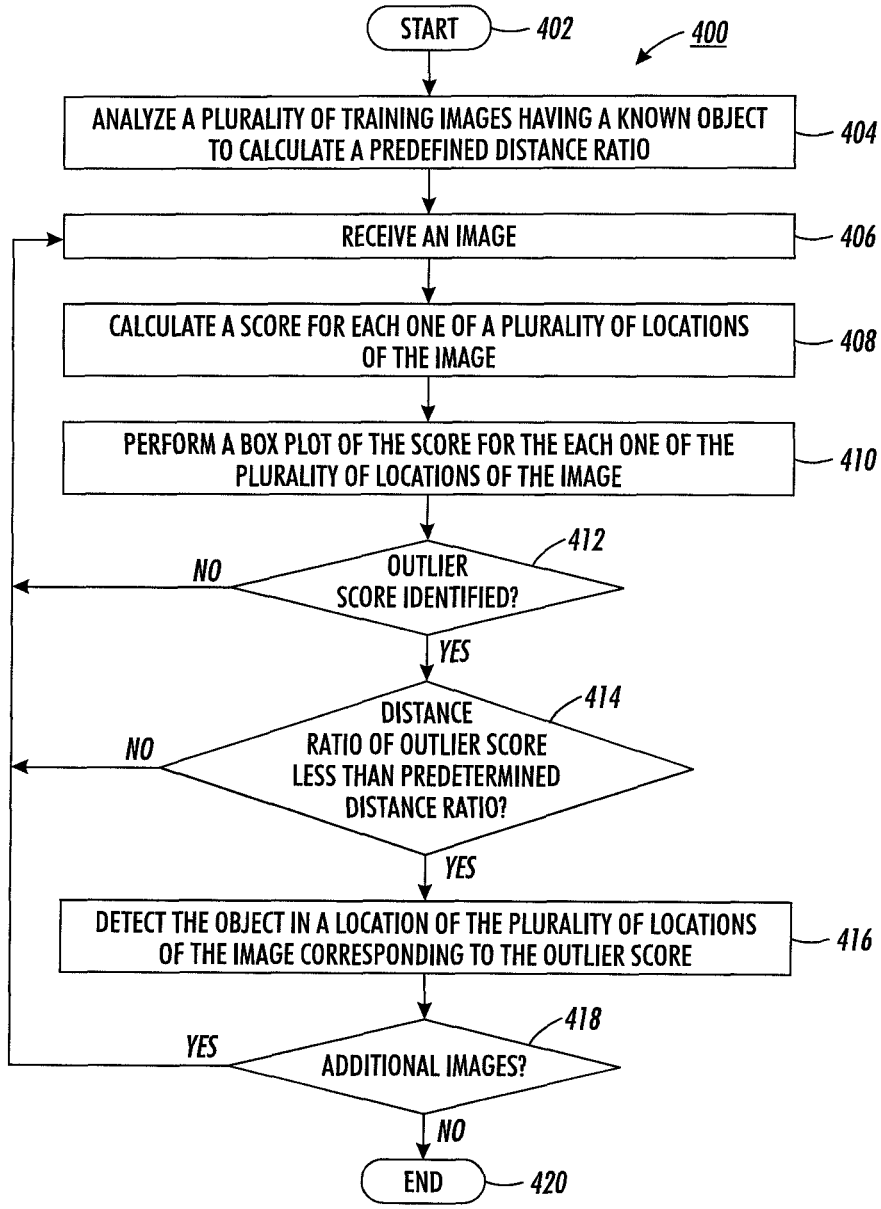
FIG. 4 illustrates an example flowchart of a method for detecting an object in an image.

FIG. 4 illustrates a flowchart of a method 400 for detecting an object in an image. In one embodiment, one or more steps or operations of the method 400 may be performed by the AS 120 or a general-purpose computer as illustrated in FIG. 5 and discussed below.

At step 402 the method 400 begins. At step 404, the method 400 analyzes a plurality of training images having a known object to calculate a predefined distance ratio. For example, the distance ratio for each one of a plurality of training images may be calculated. Based upon the calculated distance ratio, a predefined distance ratio threshold may be used for subsequently analyzed images to identify an object in an image. In one embodiment, the predefined distance ratio threshold may be approximately 0.6 for NIR images of 750 nanometers (nm) to 1000 nm.

At step 406, the method 400 receives an image. For example, an image capture device such as, for example, a near infrared (NIR) band image capture device, a camera, a video camera, and the like, may capture an NIR image, photograph, video and the like.

At step 408, the method 400 calculates a score for each one of a plurality of locations in the image. In one embodiment, Equation 1 described above may be used to calculate the score of each one of the plurality of locations in the image.

At step 410, the method 400 performs a box plot of the score of the each one of the plurality of locations of the image. For example, all of the scores that were calculated in step 408 may be tallied or graphed into a box plot, such as the box plot 300, illustrated in FIG. 3.

At step 412, the method 400 determines if an outlier score is identified. In one embodiment, an outlier score may be any score that does not fall within the bounds of the box plot. In one embodiment, multiple outlier scores may be identified. If an outlier score is not identified, the method 400 may return to step 406 to receive and analyze another image. However, if an outlier score is identified, the method 400 may proceed to step 414.

At step 414, the method 400 determines if a distance ratio of the outlier score is less than the predetermined distance ratio. For example, a first distance measured from the median of the box plot to the second highest score is compared to a second distance measured from the median of the box plot to the outlier score of the box plot to obtain the distance ratio. If the distance ratio of the outlier score is greater than the predetermined distance ratio the method 400 may return to step 406 to receive and analyze another image. However, if the distance ratio of the outlier score is less than the predetermined distance ratio, the method 400 may proceed to step 416.

At step 416, the method 400 detects the object in a location of the plurality of locations of the image corresponding to the outlier score. For example, if the method 400 is being used to detect a person for automated management of vehicles in HOV/HOT lanes, the object that is detected may be a person. The number of objects detected in the image may be tallied and provided to determine if a vehicle has enough passengers to qualify for user of the HOV/HOT lanes.

In one embodiment, when the objects being detected are people, the object detection may be used to automatically regulate or manage the HOV/HOT lanes. For example, the total number of people in the vehicle may be calculated by summing the total number of objects detected in the vehicle from the images that are analyzed. If the total number of people is less than a total number of passengers requirement for the HOV/HOT lane, a ticket may be automatically generated and mailed to the registered owner of the vehicle. The registered owner of the vehicle may be identified based on a license plate number captured in the image.

At step 418, the method 400 determines if there are any additional images remaining that need to be analyzed. For example, a plurality of images may be analyzed. In one embodiment, the images may be continually received as multiple cars enter the HOV/HOT lanes. If there are additional images, the method 400 returns to step 406 to receive the next image. If there are no additional images, the method 400 proceeds to step 420. At step 420, the method 400 ends.

As a result, the embodiments of the present disclosure provide an automated method for detecting objects (e.g., people) that can be used to automatically manage and regulate HOV/HOT lanes. Thus, law enforcement officers may be more efficiently used rather than manually being required to count passengers in each vehicle that enter the HOV/HOT lanes.

It should be noted that although not explicitly specified, one or more steps, functions, or operations of the method 400 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 4 that recite a determining operation, or involve a decision, do not necessarily require that both branches of the determining operation be practiced. In other words, one of the branches of the determining operation can be deemed as an optional step.

Figure 5:
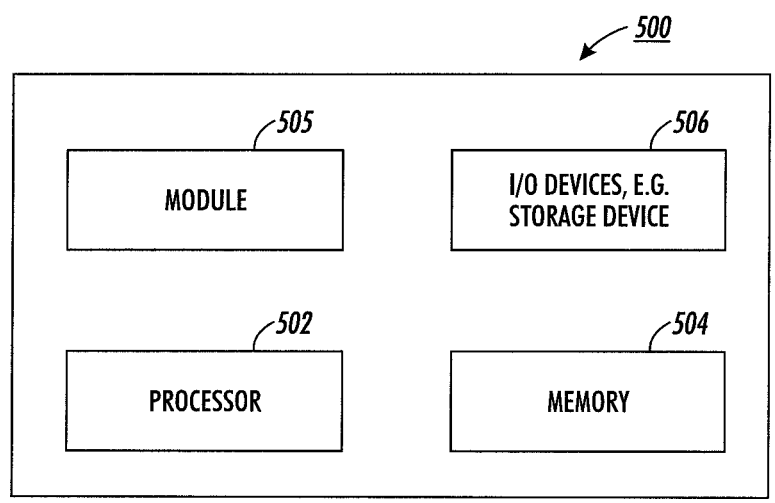
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a SIMD, a CPU, and the like), a memory 504, e.g., random access memory (RAM) and/or read only memory (ROM), a module 505 for detecting an object in an image, and various input/output devices 506 (e.g., storage devices, including but not limited to, a tape drive, a floppy drive, a hard disk drive or a compact disk drive, a receiver, a transmitter, a speaker, a display, a speech synthesizer, an output device (such as a graphic display, printer, and the like), an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 505 for detecting an object in an image can be loaded into memory 504 and executed by processor 502 to implement the functions as discussed above. As such, the present method 505 for detecting an object in an image (including associated data structures) of the present disclosure can be stored on a non-transitory (e.g., physical and tangible) computer readable storage medium, e.g., RAM memory, magnetic or optical drive or diskette and the like. For example, the hardware processor 502 can be programmed or configured with instructions (e.g., computer readable instructions) to perform the steps, functions, or operations of method 400.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for detecting an object in an image, comprising:
receiving, by a processor, the image;
calculating, by the processor, a score for each one of a plurality of locations in the image;
performing, by the processor, a box plot of the score of the each one of the plurality of locations of the image;
identifying, by the processor, an outlier score that falls outside of the box plot;
determining, by the processor, that a distance ratio of the outlier score is less than a predefined distance ratio, wherein the distance ratio is a ratio that is based upon a comparison of a first distance of a second highest score and a second distance of the outlier score; and
detecting, by the processor, the object in a location of the plurality of locations of the image corresponding to the outlier score.

2. The method of claim 1, wherein the image is a near infrared (NIR) image of a vehicle.

3. The method of claim 1, wherein the object is a person and the image is analyzed to determine a total number of people in a vehicle for compliance with a high occupancy vehicle lane or a high occupancy tolling lane.

4. The method of claim 1, wherein the predefined distance ratio is based upon a plurality of training data.

5. The method of claim 1, wherein the first distance is measured from a median value of the box plot to the second highest score and the second distance is measured from the median value to the outlier score.

6. The method of claim 1, wherein the calculating is performed in accordance with a function based upon one or more landmark points and a mixture of parts of the image.

7. The method of claim 6, wherein the function is defined by an equation comprising:

$$S(I, L, m) = App_m(I, L) + Shape_m(L) + \alpha^m,$$

$$App_m(I, L) = \sum_{i \in V_m} w_i^m \cdot \phi(I, l_i)$$

$$Shape_m(L) = \sum_{ij \in E_m} a_{ij}^m dx^2 + b_{ij}^m dx + c_{ij}^m dy^2 + d_{ij}^m dy$$

wherein S is a score as a function of the image being analyzed I, the one or more landmark points L tuned for mixture m, $\phi(I,l_i)$ is the HoG (Histogram of Gradients) features extracted at location $l_i$, $App_m$ is a sum of appearance evidence for placing a template $w_i^m$ for a part tuned for mixture m at a location $l_i$ of the image, $Shape_m$ is a score of a mixture specific spatial arrangement of parts L, dx and dy are the x-axis and y-axis displacements of part i with respect to part j, parameters (a, b, c, d) specify spatial cost constraints between pairs of parts i and j or a geometric relationship between the one or more landmark points and $\alpha^m$ is a constant for the mixture m, wherein $V_m$ comprises a pool of parts belonging to the mixture m, wherein $E_m$ represents a set of edges between the pool of parts in $V_m$.

8. A non-transitory computer-readable medium storing a plurality of instructions, which when executed by a processor, cause the processor to perform operations for detecting an object in an image, the operations comprising:
 receiving the image;
 calculating a score for each one of a plurality of locations in the image;
 performing a box plot of the score of the each one of the plurality of locations of the image;
 identifying an outlier score that falls outside of the box plot;
 determining that a distance ratio of the outlier score is less than a predefined distance ratio, wherein the distance ratio is a ratio that is based upon a comparison of a first distance of a second highest score and a second distance of the outlier score; and
 detecting the object in a location of the plurality of locations of the image corresponding to the outlier score.

9. The non-transitory computer-readable medium of claim 8, wherein the image is a near infrared (NIR) image of a vehicle.

10. The non-transitory computer-readable medium of claim 8, wherein the object is a person and the image is analyzed to determine a total number of people in a vehicle for compliance with a high occupancy vehicle lane or a high occupancy tolling lane.

11. The non-transitory computer-readable medium of claim 8, wherein the predefined distance ratio is based upon a plurality of training data.

12. The non-transitory computer-readable medium of claim 8, wherein the first distance is measured from a median value of the box plot to the second highest score and the second distance is measured from the median value to the outlier score.

13. The non-transitory computer-readable medium of claim 8, wherein the calculating is performed in accordance with a function based upon one or more landmark points and a mixture of parts of the image.

14. The non-transitory computer-readable medium of claim 13, wherein the function is defined by an equation comprising:

$$S(I,L,m) = \text{App}_m(I,L) + \text{Shape}_m(L) + \alpha^m,$$

$$\text{App}_m(I, L) = \sum_{i \in V_m} w_i^m \cdot \phi(I, l_i)$$

$$\text{Shape}_m(L) = \sum_{ij \in E_m} a_{ij}^m dx^2 + b_{ij}^m dx + c_{ij}^m dy^2 + d_{ij}^m dy$$

wherein S is a score as a function of the image being analyzed I, the one or more landmark points L tuned for mixture m, $\phi(I,l_i)$ is the HoG (Histogram of Gradients) features extracted at location $l_i$, $\text{App}_m$ is a sum of appearance evidence for placing a template $w_i^m$ for a part tuned for mixture m at a location $l_i$ of the image, $\text{Shape}_m$ is a score of a mixture specific spatial arrangement of parts L, dx and dy are the x-axis and y-axis displacements of part i with respect to part j, parameters (a, b, c, d) specify spatial cost constraints between pairs of parts i and j or a geometric relationship between the one or more landmark points and $\alpha^m$ is a constant for the mixture m, wherein $V_m$ comprises a pool of parts belonging to the mixture m, wherein $E_m$ represents a set of edges between the pool of parts in $V_m$.

15. A method for detecting an object in an image, comprising:
 analyzing, by a processor, a plurality of training images having a known object to calculate a predefined distance ratio;
 receiving, by the processor, the image, wherein the image is of a vehicle;
 calculating, by the processor, a score for each one of a plurality of locations in the image, wherein the scoring is performed in accordance with a function based upon one or more landmark points and a mixture of parts of the image;
 performing, by the processor, a box plot of the score of the each one of the plurality of locations of the image, the box plot comprising a lowest score, a $25^{th}$ percentile, a median, a $75^{th}$ percentile and a second highest score;
 identifying, by the processor, an outlier score that falls outside of the box plot;
 determining, by the processor, that a distance ratio of the outlier score is less than the predefined distance ratio;
 detecting, by the processor, the object in a location of the plurality of locations of the image corresponding to the outlier score, wherein the object is a person; and
 calculating, by the processor, a total number of objects in the image to determine if the vehicle is in violation of a total number of passengers requirement for a high occupancy vehicle lane.

16. The method of claim 15, wherein the image is a near infrared (NIR) image.

17. The method of claim 15, wherein the image is captured when the vehicle enters the high occupancy vehicle lane.

18. The method of claim 15, wherein the function is defined by an equation comprising:

$$S(I, L, m) = \text{App}_m(I, L) + \text{Shape}_m(L) + \alpha^m,$$

$$\text{App}_m(I, L) = \sum_{i \in V_m} w_i^m \cdot \phi(I, l_i)$$

$$\text{Shape}_m(L) = \sum_{ij \in E_m} a_{ij}^m dx^2 + b_{ij}^m dx + c_{ij}^m dy^2 + d_{ij}^m dy$$

wherein S is a score as a function of the image being analyzed I, the one or more landmark points L tuned for mixture m, $\phi(I,l_i)$ is the HoG (Histogram of Gradients) features extracted at location $l_i$, $\text{App}_m$ is a sum of appearance evidence for placing a template $w_i^m$ for a part tuned for mixture m at a location $l_i$ of the image, $\text{Shape}_m$ is a score of a mixture specific spatial arrangement of parts L, dx and dy are the x-axis and y-axis displacements of part i with respect to part j, parameters (a, b, c, d) specify spatial cost constraints between pairs of parts i and j or a geometric relationship between the one or more landmark points and $\alpha^m$ is a constant for the mixture m, wherein $V_m$ comprises a pool of parts belonging to the mixture m, wherein $E_m$ represents a set of edges between the pool of parts in $V_m$.

* * * * *